US005530797A

United States Patent [19]

Uya et al.

[11] Patent Number: 5,530,797

[45] Date of Patent: Jun. 25, 1996

[54] WORKSTATION FOR SIMULTANEOUSLY DISPLAYING OVERLAPPED WINDOWS USING A PRIORITY CONTROL REGISTER

[75] Inventors: Masaru Uya; Norihiko Mizobata; Takuya Sayama; Satoshi Takahashi; Takeshi Ichise; Takeshi Kawano; Taizou Tsujimoto, all of Osaka, Japan

[73] Assignee: Matsushita Electric Industrial Co., Ltd., Osaka, Japan

[21] Appl. No.: 43,753

[22] Filed: Apr. 7, 1993

[30] Foreign Application Priority Data

Apr. 9, 1992 [JP] Japan .................................. 4-088538

[51] Int. Cl.[6] .................................................. G06F 12/00

[52] U.S. Cl. ........................................... 395/164; 395/162

[58] Field of Search .................................. 395/155, 157, 395/158, 152, 101, 118, 133, 135, 140, 162, 163, 164, 165, 166; 348/563, 564, 565, 567, 568, 569, 571, 575, 589, 596, 722

[56] References Cited

U.S. PATENT DOCUMENTS

| | | | |
|---|---|---|---|
| 4,769,762 | 9/1988 | Tsujido | 364/521 |
| 4,819,189 | 4/1989 | Kikuchi et al. | 364/521 |
| 4,947,257 | 8/1990 | Fernandez et al. | 348/596 |
| 4,954,819 | 9/1990 | Watkins | 395/157 |
| 4,974,196 | 11/1990 | Iwami et al. | 364/900 |
| 5,115,310 | 5/1992 | Takano et al. | 348/722 |
| 5,185,666 | 2/1993 | Capitant et al. | 348/588 |
| 5,185,858 | 2/1993 | Emery et al. | 395/158 |
| 5,206,714 | 4/1993 | Kim | 358/22 |
| 5,212,795 | 5/1993 | Hendry | 395/725 |
| 5,239,373 | 8/1993 | Tang et al. | 348/552 |
| 5,262,866 | 11/1993 | Hong | 358/183 |
| 5,262,965 | 11/1993 | Putnam et al. | 395/101 |
| 5,321,811 | 6/1994 | Kato et al. | 395/166 |
| 5,325,480 | 6/1994 | Rice | 395/152 |

FOREIGN PATENT DOCUMENTS 2-155030 6/1990 Japan .

*Primary Examiner*—Mark R. Powell
*Assistant Examiner*—U. Chauhan
*Attorney, Agent, or Firm*—Hofer Willian Brinks Gilson & Lione

[57] ABSTRACT

Pixel data is selected from among first and second dynamic-image memories (DI1, DI2) and a static-memory (SI). In the invention, (a) first and second window area memories (WA1, WA2) for designating shapes and sizes of windows to which video dynamic-images are assigned respectively, (b) first and second dynamic-image area memories (DA1, DA2) for designating memory locations of data stored in both the dynamic-image memories, and (c) a priority control register for designating which video dynamic-image should be displayed in front when video dynamic-images overlap with each other are provided, whereby display for every pixel is executed according to a logical AND value of read-out data from WA1 and read-out data from DA1, a logical AND value of read-out data from WA2 and read-out data from DA2, and read-out data from the priority control register. Thus two video dynamicimages assigned to their respective windows are simultaneously displayed while subjecting them to overlap control, and special techniques including auto-zooming can be accomplished in real time.

9 Claims, 8 Drawing Sheets

WORKSTATION FOR SIMULTANEOUSLY DISPLAYING OVERLAPPED WINDOWS USING A PRIORITY CONTROL REGISTER

BACKGROUND OF THE INVENTION

This invention relates to a workstation for video display to display simultaneously a plurality of video dynamic-images assigned to their respective windows on a screen while subjecting such video dynamic-images to overlap control.

For user-friendly communication, the computer industry has developed sophisticated computers called multi-media computers which introduce media with a time base, such as sounds and video movie-images (hereinafter referred to as the "video dynamic-images") in addition to conventional media in graphical or character form.

Multi-media computers are realized by means of a workstation capable of interactive processing, wherein a multi-window management program is run so as to display within a window occupying a given area on a color display screen a video dynamic-image assigned to that window. Video dynamic-images are assigned to their respective windows, and thus if one window is obstructed by another window its video dynamic-image may also be obstructed partly or entirely by that window, and if a window is moved to a different area its video dynamic-image moves with it. Such a dynamic-image thus undergoes the same processing as a background image (hereinafter referred to as the "static-image") formed by, for example, characters and graphics.

FIG. 8 shows a conventional workstation for video display. This workstation comprises a central processing unit (CPU) 11, a data bus 12, a video signal processing circuit (VSP) 7, a static-image memory (SI) 1, a dynamic-image memory (DI) 2, a key plane memory (KEY) 34, a color look-up table (LUT) 8, a data selector 6, a digital-to-analog (D/A) converter 9, and a color display 10.

Under time-sharing/multi-task operating system control, the CPU 11 runs a multi-window management program for rendering control and interchanges data with a main storage unit and an input/output unit (for example, a hard disk unit) via the data bus 12. The static-image memory 1, the dynamic-image memory 2, and the key plane memory 34 are dual port memories having the same configuration as a conventional frame memory known as a VRAM (video RAM). Data can be written into and read from each left-hand first port while data can be read from each right-hand second port. These memories 1, 2, and 34 each have a resolution (or, a pixel capacity) of 1280 by 1024 pixels. The static-image memory 1, the dynamic-image memory 2, and the key plane memory 34 are used respectively to temporarily store 8-bit data, 24-bit data, and 1-bit data per pixel.

The VSP 7 executes an analog-to-digital (A/D) conversion to convert a video analog signal (for instance, an NTSC composite video signal) transmitted from the outside into digital data, processes them, and sends out dynamic-image data corresponding to a field image of a video picture at intervals of 1/60 second. Before this, the CPU 11 sets to the VSP 7 control commands describing the content of video signal processing. The control commands include information to be utilized for clipping a video dynamic-image out of an original image, for magnifying/reducing the video dynamic-image, for locating the video dynamic-image on the screen of the color display 10, and for controlling the contrast/brightness of the video dynamic-image. Dynamic-image data output from the VSP 7 is written into the dynamic-image memory 2 through its first port.

Via the data bus 12, static-image data of one frame is written into the static-image memory 1 by the CPU 11. Key data for selecting a video dynamic-image or a static-image per pixel is written into the key plane memory 34. In the key plane memory 34, data "1" is written to at pixel addresses corresponding to the video dynamic-image, while data "0" is written to at pixel addresses corresponding to the static-image. These items of key data per pixel are fed to the data selector 6 as a select input (S-input).

8-bit data read from the static-image memory 1 (that is, 256 individual items of color-designation data) is converted into 24-bit (color) data pixel by pixel by means of the LUT 8. The data selector 6 outputs selectively, more specifically, it outputs 24-bit (color) data from the LUT 8 based on read-out data of the static-image memory 1 if S="0"; on the other hand it outputs 24-bit (color) data from the dynamic-image memory 2 if S="1". The data output from the data selector 6 is converted by the D/A converter 9 into analog RGB video signals, and displayed by the color display 10 with a resolution of 1280 by 1024 pixels.

A read-out control signal RD in synchronization with the video signals transmitted to the color display 10 and a readout address ADDR are mutually supplied to the second port of each of the static-image memory 1, the dynamic-image memory 2, and the key plane memory 34. This will display a video dynamic-image, assigned to one window, on the screen of the color display 10. In FIG. 8, a sailing yacht is displayed. When the user executes an operation so as to change a shape of the window to which the video dynamic-image is assigned, the CPU 1 must respond immediately to such a user's operation so as to change key data in the key plane memory 34. The window of FIG. 8 is obstructed by a pull-down menu. The static-image memory 1 holds static-image data corresponding to such a pull-down menu.

A pull-down menu is pulled down or closed by means of a mouse. If a mouse is moved to close the pull-down menu of FIG. 8, this movement is transmitted to the CPU 11 as an event interrupt. The CPU 11 then runs a multi-window management program under time-sharing/multi-task operating system control. This activates a series of operations so that corresponding graphic data to the pull-down menu, stored in the static-image memory 1, is deleted and a pattern recess of data "1" in the key plane memory 34 is padded to change the pattern into a rectangle form. A mouse is also used to move, re-size, open, or close a window. Since it is easy for the CPU 11 to catch up with rather slow movements of a handheld mouse, this somehow makes it possible to offer a real time response to a mouse-activated operation, even under time-sharing/multi-task operating system control.

In multi-media applications, special techniques such as auto-zooming (automatic repetition between zoom-in and zoom-out actions) and spinning (vertical/lateral spin) are required in addition to conventional techniques used in televisions. To accomplish these special techniques, it is necessary to overwrite the key plane memory 34 very often. It is however impossible for the CPU 11 to dedicate to overwriting the key plane memory 34, under time-sharing/multi-task operating system control where a plurality of tasks are processed concurrently. As a result, if the number of tasks to be processed increases, this will disadvantageously make auto-zooming become unsmooth and broken.

Suppose that the method of FIG. 8 is employed to display simultaneously two video dynamic-images assigned to their respective windows, some modifications are required. Firstly, a first and a second VSP 7, a first and a second dynamic-image memory 2, and a first and a second key plane memory 34 are required in view of two video dynamic-images. Secondly, the data selector 6 is modified so that it selects one from among outputs of the static-image memory 1 and the two dynamic-image memories 2 according to outputs of the first and second key plane memories.

In accordance with the configuration mentioned above, when selecting a first video dynamic-image with respect to a certain pixel, data "1" is written to at a corresponding pixel address of the first key plane memory while data "0" is written into at a corresponding pixel address of the second key plane memory. Conversely, when selecting a second video dynamic-image, data "0" is written into at a corresponding pixel address of the first key plane memory while data "1" is written into at a corresponding pixel address of the second key plane memory. Further, when selecting a static-image with respect to a certain pixel, data "0" is set at a corresponding pixel address of the first key plane memory as well as at a corresponding pixel address of the second key plane memory. In a case where data "1" and data "1" are set, either one of the video dynamic-images is selected depending on the data selector 6's hardware. For example, if a first dynamic-image is partly or entirely obstructed by a second dynamic-image, and if it is required to change an overlap relation between two windows to which these dynamic-images are respectively assigned so as to have the first dynamic-image come in front of the second dynamic-image, this necessitates overwriting each item of data at pixel addresses of the first key plane memory corresponding to the overlapping area, from "O's" to "1's" and each item of data at pixel addresses of the second key plane memory corresponding to the overlapping area, from "1's" to "0's". This overlap control, in which a plurality of key plane memories are subject to being overwritten, presents a serious burden to the CPU 11.

DISCLOSURE OF THE INVENTION

With the foregoing background of the invention in mind, it is therefore an object of the present invention to provide an improved workstation for video display to display simultaneously a plurality of video dynamic-images assigned to their respective windows while subjecting these dynamic-images to overlap control. It is another object of the invention to accomplish special techniques such as auto-zooming in real time, even under time-sharing/multi-task operating system control.

In accordance with this invention, a conventional key plane memory is divided into two individual memories, namely a window area memory and a dynamic-image area memory, with respect to each dynamic-image. Additionally, the invention employs a priority control register. For the designation of shapes and sizes of windows to which video dynamic-images are assigned respectively, each window area memory holds window area data per pixel indicating whether each pixel forming a picture to be displayed locates inside the windows. For the designation of memory locations of respective dynamic-image data, each dynamic-image area memory holds dynamic-image area data per pixel indicating whether each pixel forming a picture to be displayed corresponds to a memory location of each dynamic-image data. According to an logical AND value of the window area data and the dynamic-image area data, display per pixel is made. The priority control register is used to hold priority data so that, at the time when an overlap of windows occurs, it is possible to perform switching between the windows to have one window come in front of the other window by means of software.

In accordance with the present invention, each window area memory is not overwritten unless a window needs reshaping or resizing, Each dynamic-image area memory designates a dynamic-image data location, regardless of window shape/ size variations. Since the logical AND operation of outputs from these two types of memories is done automatically at a high speed by means of hardware, this accomplishes smooth, unbroken auto-zooming.

Further, because of the provision of a priority control register that stores information to designate which one of video dynamic-images should come in front of another, a switch can be realized by means of hardware. In addition to displaying a single video dynamic-image inside a single window, this allows plural video dynamic-images to be displayed simultaneously inside a single window while subjecting such dynamic-images to overlap control. Therefore, the present invention presents beneficial advantages to multi-media-related applications where two and more video dynamic-images are to be displayed.

PREFERRED EMBODIMENTS OF THE INVENTION

Figure 1:
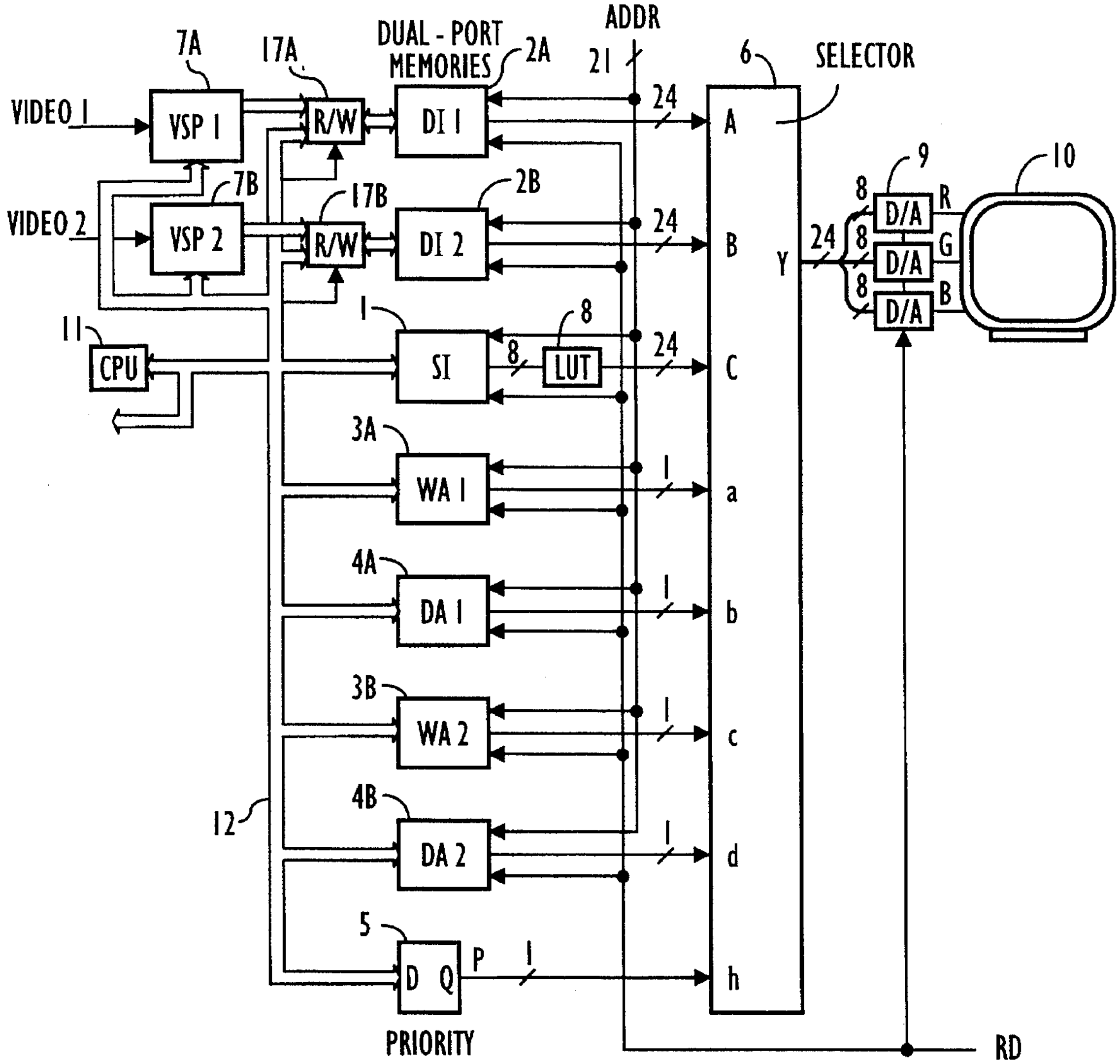
FIG. 1 is a block diagram showing a workstation for video display in accordance with a first embodiment of the invention.

Four different workstations for video display in accordance with the invention are described by referring to the drawings.

FIRST EMBODIMENT

A first workstation for video display of a first embodiment of the invention, shown in FIG. 1, is used to display a picture formed by a single static-image as a background image and two video dynamic-images assigned to their respective windows. This workstation comprises a central processing unit (CPU) 11, a data bus 12, a first video signal processing circuit (VSP1) 7A, a second video signal processing circuit (VSP2) 7B, a first read/write (R/W) control circuit 17A, a second read/write (R/W) control circuit 17B, a static-image memory (SI) 1, a first dynamic-image memory (DI1) 2A, a second dynamic-image memory (DI2) 2B, a first window area memory (WA1) 3A, a second window area memory (WA2) 3B, a first dynamic-image area memory (DA1) 4A, a second dynamicimage area memory (DA2) 4B, a priority control register 5, a color look-up table (LUT) 8, a data selector 6, a digital-to-analog (D/A) converter 9, and a color display 10.

Under time-sharing/multi-task OS control, the CPU 11 runs a multi-window management program for rendering control. The static-image memory 1, the first dynamic-image memory 2A, the second dynamic-image memory 2B, the first window area memory 3A, the second window area memory 3B, the first dynamic-image area memory 4A, the second dynamic-image area memory 4B are all dual port memories having the same configuration as a conventional frame memory. Thus data can be written into and read from each left-hand first port while data can be read from each right-hand second port. These memories 1 to 4B each have a resolution of 1280 by 1024 pixels. The static-image memory 1, the first and second dynamic-image memories 2A and 2B, the first and second window area memories 3A and 3B, and the first and second dynamic-image area memories 4A and 4B are used to temporarily store 8-bit data, 24-bit data, 1-bit data, and 1-bit data per pixel, respectively.

Figure 8:
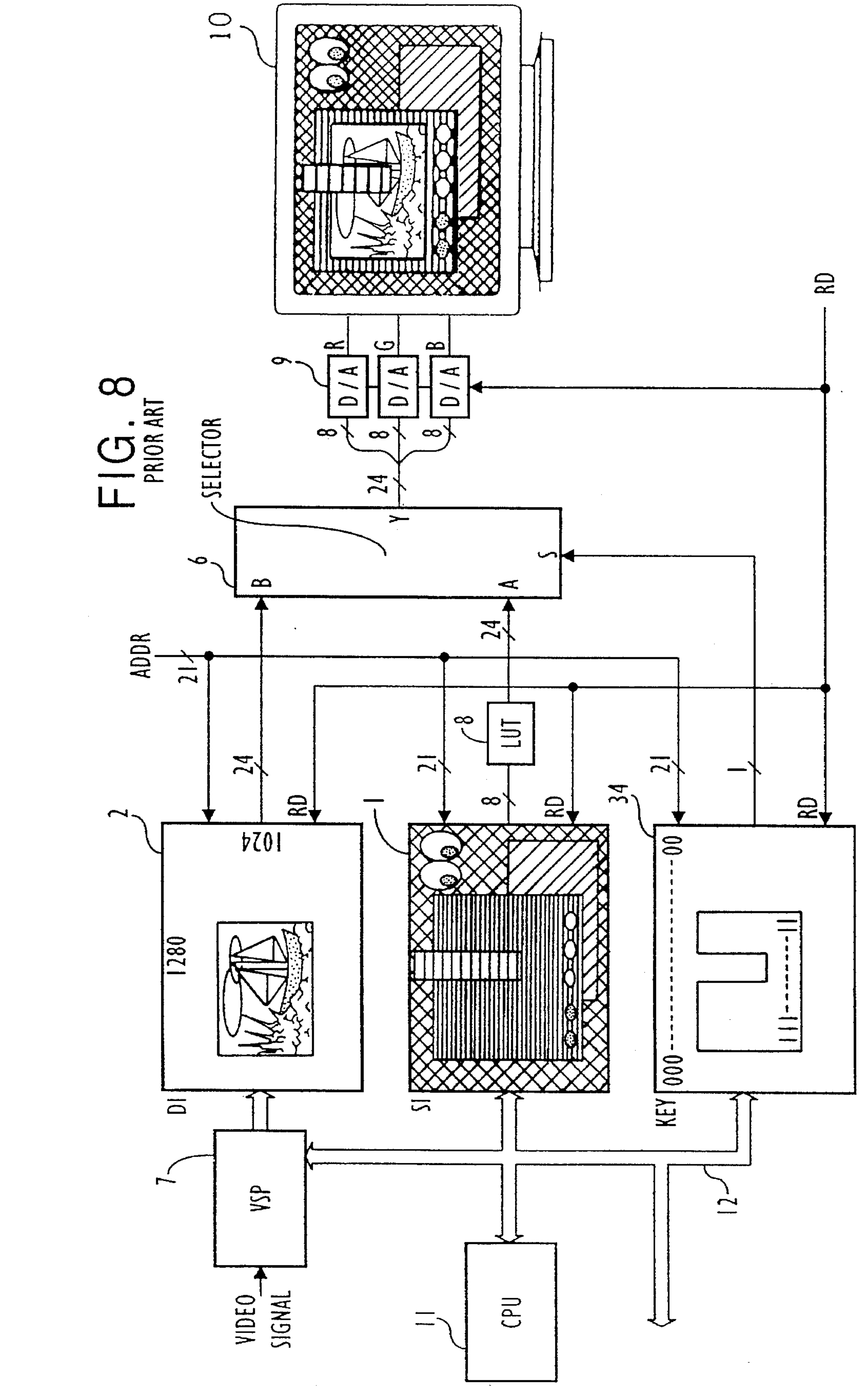
FIG. 8 PRIOR ART
FIG. 8 is a block diagram illustrating a conventional workstation for video display.

The first and second VSP's 7A and 7B perform the same function as the VSP 7 as shown in FIG. 8. First dynamic-image data output from the first VSP 7A, via the first R/W control circuit 17A, is written into the first dynamic-image memory 2A through the first port thereof. Second dynamic-image data output from the second VSP 7B, via the second R/W control circuit 17B, is written into the second dynamic-image memory 2B through the first port thereof.

Under its normal setting, the first and second R/W control circuits 17A and 17B are supplied with first and second dynamic-image data processed at and output constantly from the first and second VSP's 7A and 7B, and have these first and second dynamic-image data constantly written into the first and second dynamic-image memories 2A and 2B, respectively. The first and second VSP's 7A and 7B output first dynamic-image data and second dynamic-image data along with information on pixel addresses of the first and second dynamic-image memories 2A and 2B. Upon receiving such pixel address information, the first and second R/W control circuits 17A and 17B begin writing the data into the first and second dynamic-image memories 2A and 2B. When dynamic-image data stored in each of the dynamic-image memories 2A and 2B is required to be read and transferred to the CPU 11 as a frozen picture or to be processed, the first and second R/W control circuits 17A and 17B execute, via the first ports of the first and second dynamic-image memories 2A and 2B, read/write control according to setting-modifications from the CPU 11.

Via the data bus 12, the CPU 11 writes static-image data for one frame formed by characters and graphics, window area data to be used to designate a shape/size of each window to which a video dynamic-image is assigned, and dynamic-image area data to be used to designate a memory location of each dynamic-image data, into the static-image memory 1, the first and second window area memories 3A and 3B, and the first and second dynamic-image area memories 4A and 4B, respectively. More specifically, when one window is obstructed by another, data "1's" are written to at pixel addresses corresponding to a non-overlapped window portion while data "0's" are written into at other pixel addresses in the first and second window area memories 3A and 3B. In the first and second dynamic-image area memories 4A and 4B, data "1's" are written into at pixel addresses in a dynamic-image display effective area corresponding to each dynamic-image data temporarily stored in the first and second dynamic-image memories 2A and 2B while data "0's" are written into at other pixel addresses. In this connection, such a dynamic-image display effective area is one that is determined depending merely on "which part of a video dynamic-image should be utilized", regardless of the shape of a window or the overlap relation between one window and another. All data per pixel in the first and second window area memories 3A and 3B as well as in the first and second dynamic-image area memories 4A and 4B are transmitted to the data selector 6 as a part of select inputs (a- to d-inputs), as shown in FIG. 1.

The priority control register 5 is a register that holds priority data P of 1-bit which determines, when an overlap occurs between two video dynamic-images, which one of the two video dynamic-images should come in front of another image. The CPU 11, via the data bus 12, writes this priority data P into the priority control register 5. The priority data P, stored in the priority control register 5, is fed to the data selector 6 as a part of the select inputs (i.e., an h-input).

The data selector 6 is supplied with an A-input (24-bit (color) data from the first dynamic-image memory 2A), a B-input (24-bit (color) data from the second dynamic-image memory 2B), and a C-input (24-bit (color) data from the LUT 8 based on 8-bit read-out data (256 individual items of color-designation data) of the static-image memory 1), thereafter selectively outputting one of these three inputs according to the five select inputs (a to d, and h). The selection rule is shown in Table 1.

TABLE 1

| SELECT INPUTS | | | |
|---|---|---|---|
| h (P) | c·d (WA2·DA2) | a·b (WA1·DA1) | OUTPUTS Y |
| X | 0 | 0 | C |
| X | 0 | 1 | A |
| X | 1 | 0 | B |
| 0 | 1 | 1 | A |
| 1 | 1 | 1 | B |

Notes:
X means don't care
a·b = logical AND value of a-input and b-input 24-bit output data Y of the data selector 6 is converted into analog RGB video signals by means of the D/A converter 9 for color display on the color display 10. A read-out control signal RD in synchronization with the video signals transmitted to the color display 10 , and a read-out address ADDR are mutually supplied to the static-image memory 1, the first and second dynamic-image memories 2A and 2B, the first and second window area memories 3A and 3B, the first and second dynamic-image area memories 4A and 4B, through their respective second ports. This allows two individual video dynamic-images assigned to different windows, say "a sailing yacht" and "two flying jets" of FIG. 2 both formed of 640 by 480 pixels, to be displayed on the color display 10. The data selector 6 then passes each dynamic-image data in the first and second dynamic-image memories 2A and 2B, according to a logical AND value (a·b of Table 1) of window area data of the first window area memory 3A and dynamic-image area data of the first dynamic-image area memory 4A and a logical AND value (c·d of Table 1) of window area data of the second window area memory 3B and dynamic-image area data of the second dynamic-image area memory 4B.

Figure 3:
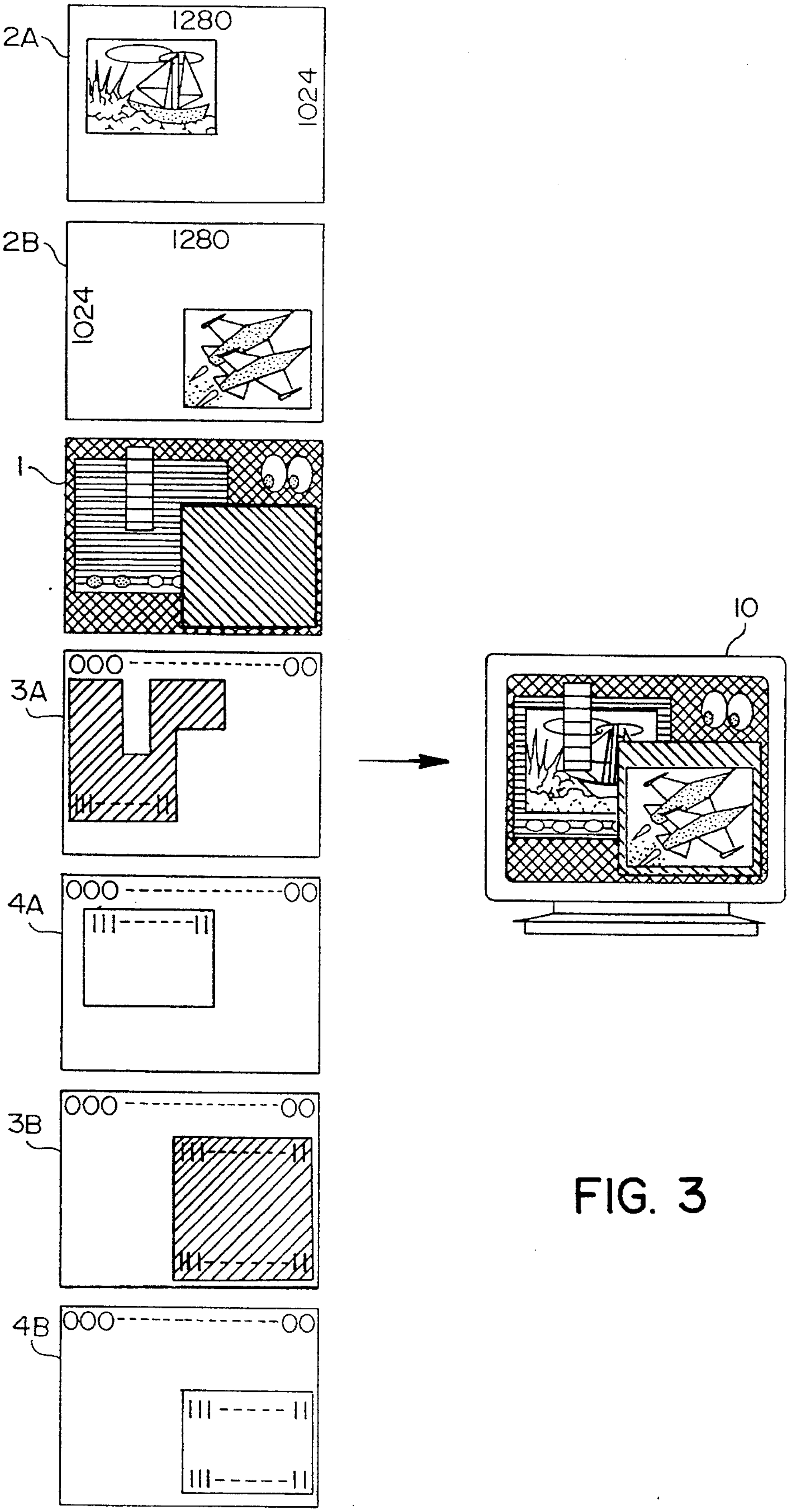
Figure 4:
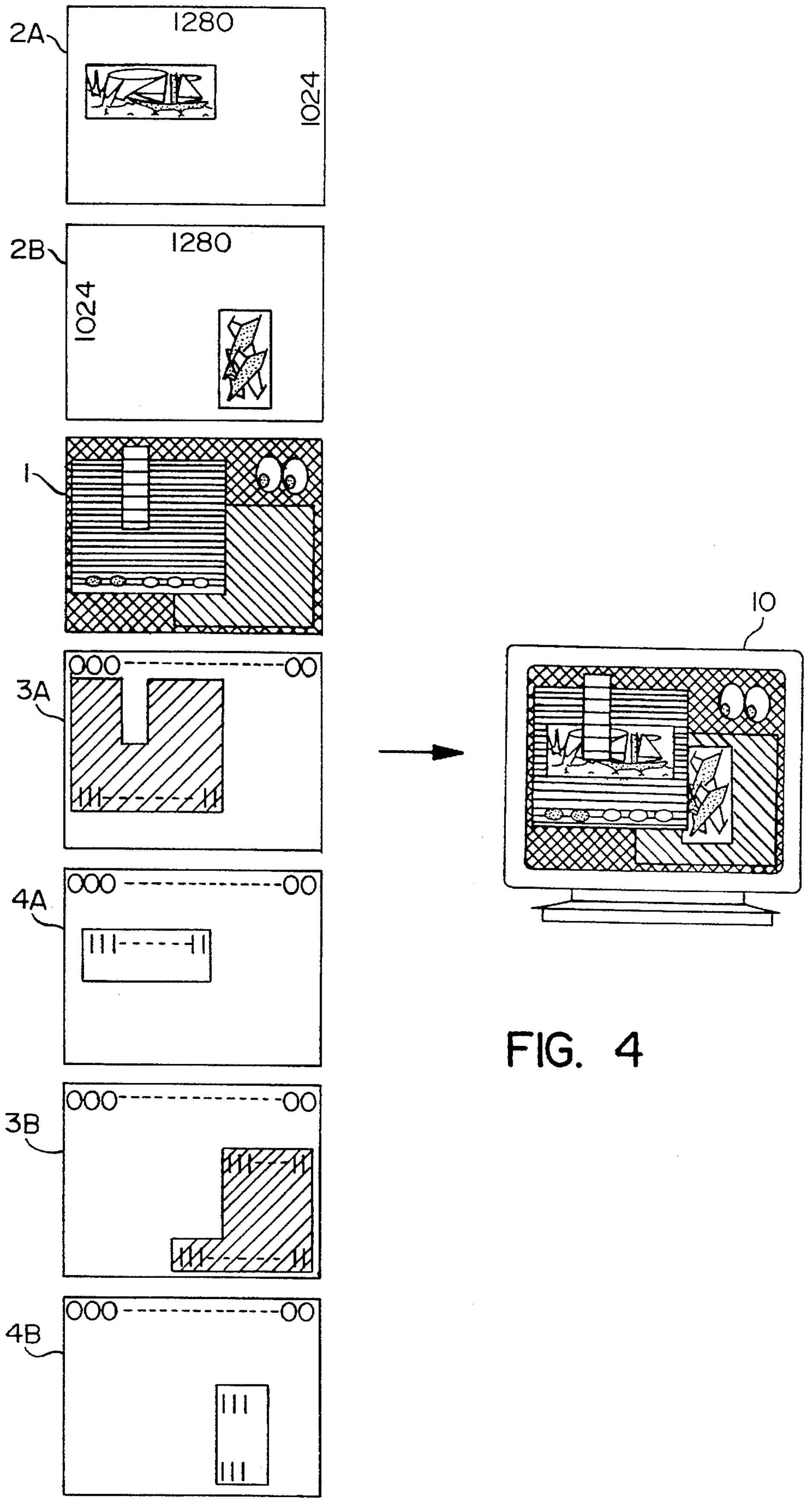

FIGS. 3 and 4 detail how to distinguish between the use of window area data and the use of dynamic-image area data.

If the operator moves a mouse or the similar device to make a window at the lower right, which is now displaying two flying jets (FIG. 2), come in front, this runs a multi-window management program to overwrite the static-image memory 1 as shown in FIG. 3. Further, because of the action of such a multi-window management program, a data "1" area in the first window area memory 3A becomes "waned" while in return a waned data "1" area in the second window area memory 3B becomes "waxed". The two video dynamic-images are thus displayed in right windows, with involving no variations in each dynamic-image data in the first and second dynamic-image area memories 4A and 4B.

Figure 2:
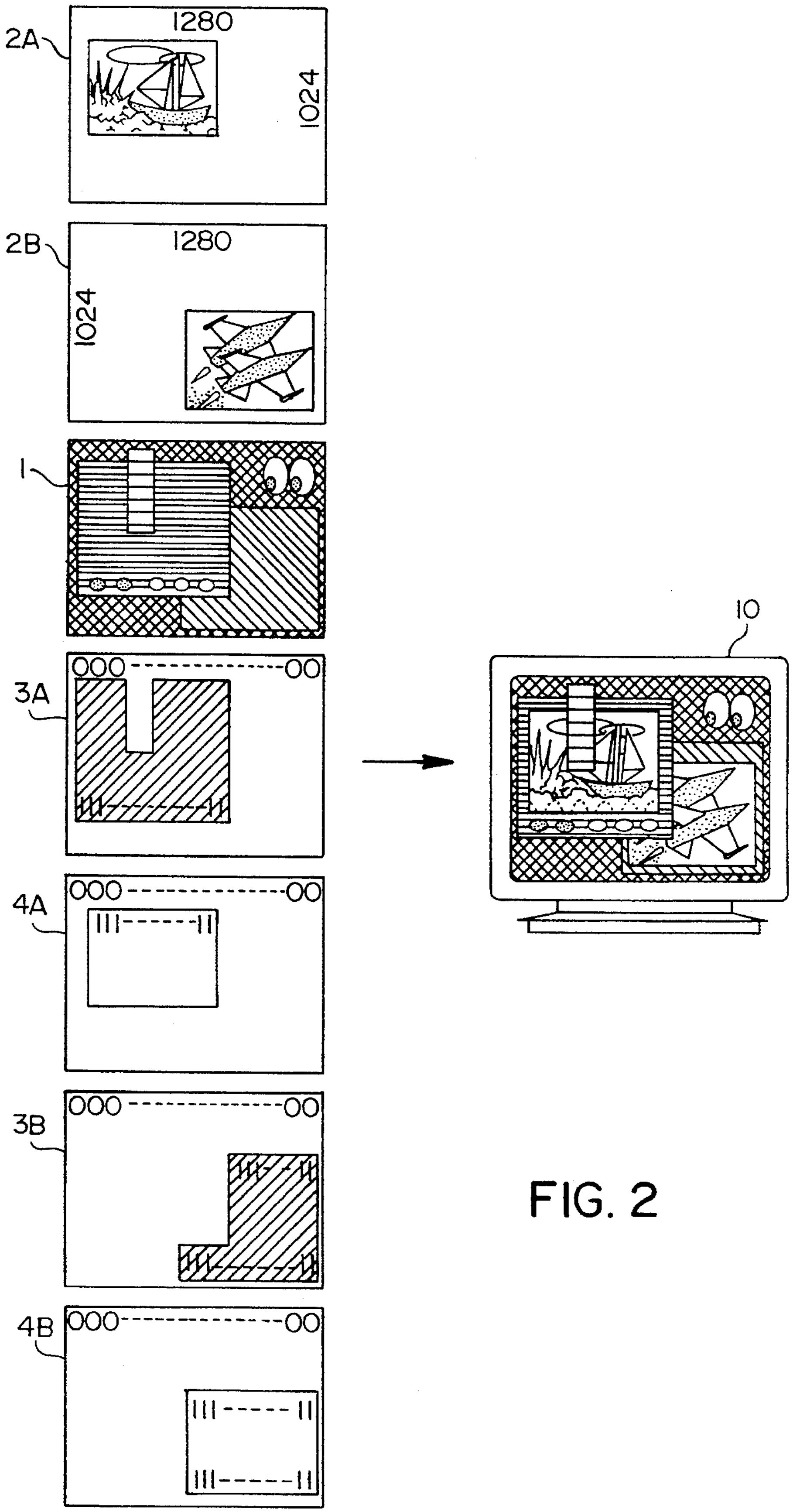
FIGS. 2–4 describe a principle upon which the workstation of FIG. 1 operates.

Next, if auto-zooming starts from a display state shown in FIG. 2 so as to vary a size of each video dynamic-image in real time (at the rate of one per 1/60 second at maximum), each control command to be supplied to the first and second VSP's 7A and 7B is updated moment by moment. As a result, each dynamic-image data in the first and second dynamic-image memories 2A and 2B becomes "shrunk" or "expanded" independently of another, which is shown in FIG. 4. Because a multi-window management program is run, each dynamic-image area data in the first and second dynamic-image area memory 4A and 4B is overwritten moment by moment in immediate response to real-time variations in each dynamic-image data. Each video dynamic-image is thus displayed in its right window under auto-zooming without the need for varying each window area data in the first and second window area memories 3A and 3B. Special techniques such as auto-zooming will be accomplished in real time under time-sharing/multi-task control.

In the above-described application designed to display a video dynamic-image in a window, each window area data in the first and second window area memories 3A and 3B is overwritten with a multi-window management program. Because of this, both a logical AND value of read-out data of the first window area memory 3A and read-out data of the first dynamic-image area memory 4A and a logical AND value of read-out data of the second window area memory 3B and read-out data of the second dynamic-image area memory 4B do not concurrently become "1". This eliminates the need for overlap control on two video dynamic-images. In an application designed to display two individual video dynamic-images in a single window, both window area data stored in the first window area memory 3A and the second window area memory 3B are so set that they perfectly match with each other. As a result, for corresponding pixels to an overlapping portion between data "1" areas in the first dynamic-image area memory 4A and the second dynamic-image area memory 4B, a selection between dynamic-image data in the first dynamic-image memory 2A and dynamic-image data in the second dynamic-image memory 2B must be made. To assist for such a selection, the output P of the priority control register 5 serves as one of the select inputs (the h-input) of the data selector 6, as shown in Table 1. In other words, when it is desired to have the first video dynamic-image come in front of the second video dynamic-image, "0" is set to the priority control register 5, whereas "1" is set to the register 5 to have the second video dynamic-image come to the front.

Freeze operations by means of the first and second R/W control circuits 17A and 17B are most attractive for multimedia applications. The first and second VSP's 7A and 7B, however, may directly write dynamic-image data to each of the first and second dynamic-image memories 2A and 2B, without passing such data through these R/W control circuits.

SECOND EMBODIMENT

Figure 5:
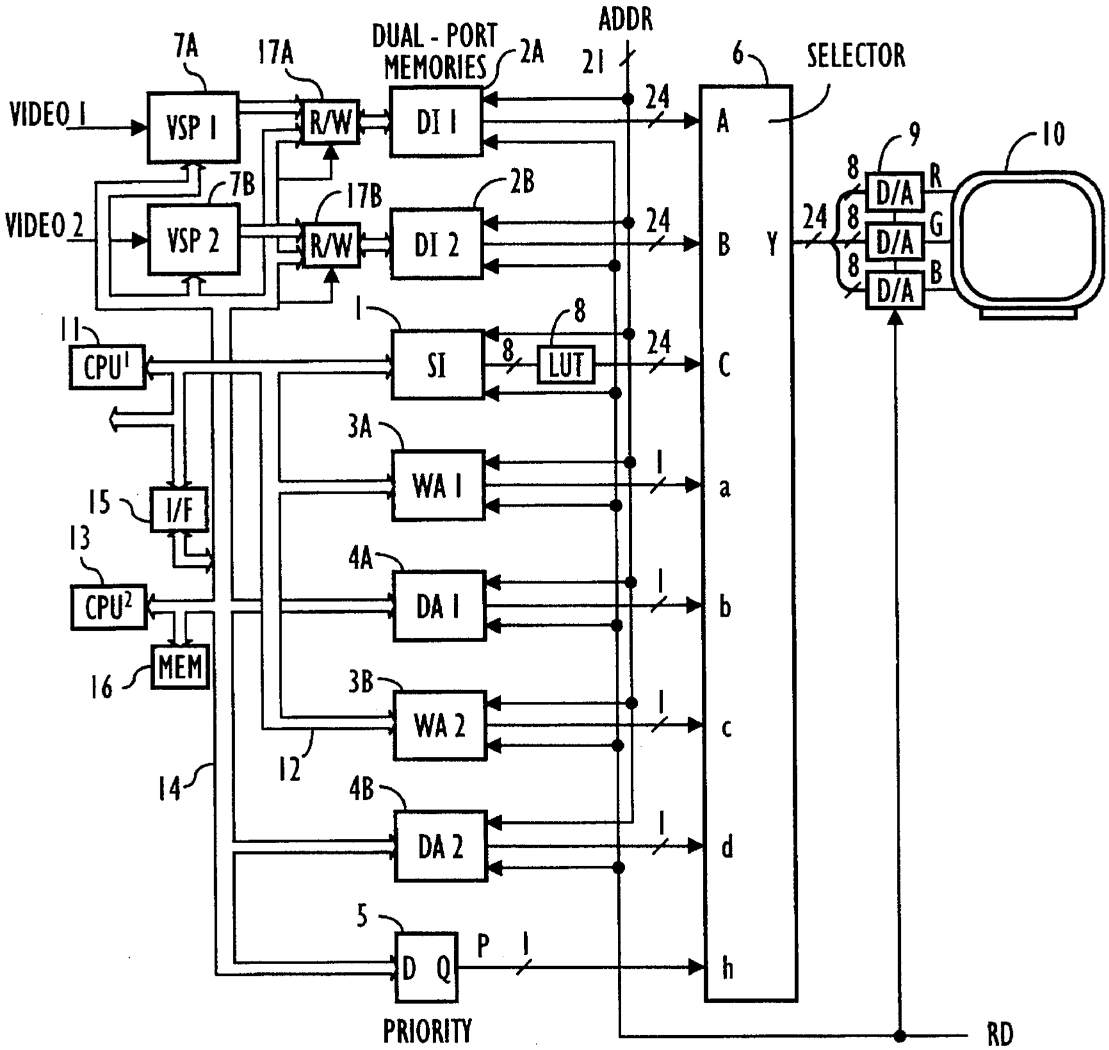
FIG. 5 is a block diagram illustrating a workstation for video display in accordance with a second embodiment of the invention.

A second workstation for video display of a second embodiment is shown in FIG. 5. This workstation is characterized in that the CPU 11 of FIG. 1 now assigns a part of its jobs to another CPU. In FIG. 5, a first and second central processing units (CPU1, CPU2) are indicated by reference numerals 11 and 13, respectively. A first and second data buses are indicated by reference numerals 12 and 14, respectively. A bus interface circuit (I/F) is represented by reference numeral 15. An instruction/data memory (MEM) is indicated by reference numeral 16. Other elements in FIG. 5 are identical with those in FIG. 1.

Under time-sharing/multi-task OS control, the first CPU 11 runs a multi-window management program for rendering control, thereby writing data to each of the static-image memory 1 and the first and second window area memories 3A and 3B via the first data bus 12. The first CPU 11 further downloads instructions and data to the instruction/data memory 16 via the bus interface circuit 15. In other words, the bus interface circuit 15 connects the second data bus 14 to the first data bus 12 at the request of the first data bus 11, subject to the condition that the second data bus 14 is being released from the second CPU 13.

The second CPU 13, which executes the instructions downloaded to the instruction/data memory 16 independently of the first CPU 11, is connected to the first and second VSP's 7A and 7B, the first and second R/W control circuits 17A and 17B, the first and second dynamic-image area memories 4A and 4B, and the priority control register 5 via the second data bus 14. The second CPU 13 controls (a) the process of setting control-commands to the first and second VSP's 7A and 7B, (b) the process of accessing to the first and second dynamic-image memories 2A and 2B via the first and second R/W control circuits 17A and 17B, and (c) the process of writing data to the first and second dynamic-image area memories 4A and 4B and the priority control register 5.

A further detailed description is given to show how the first and second CPU's 11 and 13 share jobs between them. The first CPU 11 first demands the right to use the data bus 14 to the bus interface circuit 15 and then transfers an instruction set down to the instruction/data memory 16. Such an instruction set contains several routines: for example, routines to generate each control command to be set to the first and second VSP's 7A and 7B, routines to execute setting-modifications of the first and second R/W control circuits 17A and 17B for access to the first and second dynamic-image memories 2A and 2B, and routines to generate each data to be written to the first and second dynamic-image area memories 4A and 4B and the priority control register 5. After having finished downloading the instruction set mentioned above to the instruction/data memory 16, the first CPU 11 releases the second data bus 14 and returns the right to use the bus 14 to the second CPU 13.

Then, if update demands for the state of a window, such as a demand to conceal one window with another window or to move a window to a different area, arise, this causes the first CPU 11 to write new static-image data to the static-image memory 1 and new window area data to the first and second window area memories 3A and 3B. If a window-state update demand exerts influence on a display mode, the first CPU 11 immediately interrupts via the bus interface circuit 15 to instruct the second CPU 13 to execute adequate processing routines so that new control commands are set to the first and second VSP's 7A and 7B and new dynamic-image area data is written to each of the first and second dynamic-image area memories 4A and 4B.

In accordance with this embodiment, operations where rapidness matters little (for example, an operation of updating the first static-image memory 1 or the first and second window area memories 3A and 3B), that is, operations that are just expected to catch up with rather slow movements of a hand-held mouse are assigned to the first CPU 11 which runs a multi-window management program under time-sharing/multi-task OS control. Conversely, operations where rapidness matters (for example, an operation of performing setting-modifications of the first and second VSP's 7A and 7B or of updating the first and second dynamic-image area memories 4A and 4B, which requires real-time auto-zooming or the like special technique) are left to the second CPU 13 capable of executing a single-task instruction set at a high speed independently of the first CPU 11. This further assures that real-time special techniques are advantageously applicable to plural video dynamic-images.

Additionally, access to the first and second dynamic-image memories 2A and 2B via the first and second R/W control circuits 17A and 17B is done by means of the second CPU 13. The first and second dynamic-image memories 2A and 2B are thus accessed at a high speed. This makes it possible to freeze a video dynamic-image obtained with a video camera device for every 0.5 to 1 second, to subject such an image to image recognition processing, and to activate a special processing routine when certain conditions are satisfied. It is possible to display a given message or issue warning sounds when, for example, a red object jumps into all over a screen. This will be very much beneficial to multi-media applications. It, however, may be possible to make the first CPU 11 share access jobs via the first and second R/W control circuits 17A and 17B.

In FIG. 5, the instruction/data memory 16 is connected only to the second data bus 14, however, such a configuration is not to be considered restrictive. The instruction/data memory 16 may be constituted with a dual port memory which stretches over both the first and second data buses 12 and 14. This configuration has an advantage over the one shown in this embodiment that it is free from overhead due to the first CPU 11 obtaining the right to use the second data bus 14. The first and second VSP's 7A and 7B may directly write dynamic-image data to each of the first and second dynamic-image memories 2A and 2B, without passing such data through these R/W control circuits.

THIRD EMBODIMENT

Figure 6:
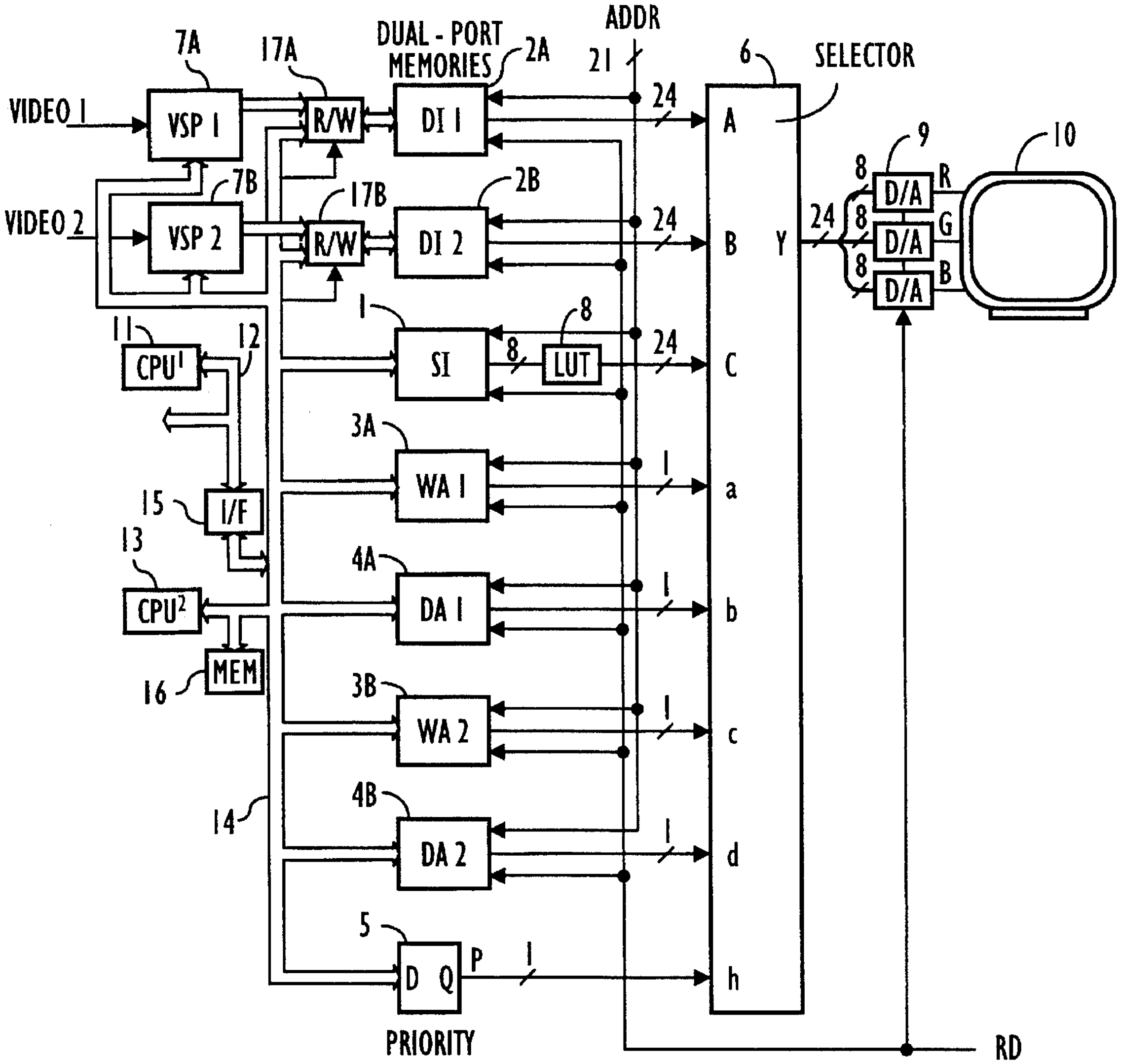
FIG. 6 is a block diagram illustrating a workstation for video display in accordance with a third embodiment of the invention.

A third workstation for video display of a second embodiment is shown in FIG. 6. In this workstation, more jobs to be processed are passed from the first CPU 11 to the second CPU 13 as compared to the second embodiment. The first CPU 11 downloads data and instructions to the instruction/data memory 16 via the bus interface circuit 15, runs plural client programs under time-sharing/multi-task OS control, and dedicates itself to issuing rendering demands according to each client program, whereas the second CPU 13 runs a server program for rendering control in a multi-window management program independently of the first CPU 11 according to a rendering demand issued from the first CPU 11. More specifically, the second CPU 13 controls (a) the process of setting control-commands to the first and second VSP's 7A and 7B, (b) the process of accessing to the first and second dynamic-image memories 2A and 2B via the first and second R/W control circuits 17A and 17B, and (c) the process of writing data to the static-image memory 1, the first and second window area memories 3A and 3B, the first and second dynamic-image area memories 4A and 4B, and the priority control register 5.

This workstation operates the same way as the second workstation except that its operation includes routines (including the server program mentioned above) for generating each data to be written into the static-image memory 1 and the first and second window area memories 3A and 3B, in an instruction set to be transferred from the first CPU 11 down to the instruction/data memory 16.

In this embodiment, in addition to high-speed operations such as an operation of setting-modifications of the first and second VSP's 7A and 7B, and an operation of update of the first and second dynamic-image area memories 4A and 4B, update operations of the static-image memory 1 and the first and second window area memories 3A and 3B are assigned to the second CPU 13 capable of high-speed processing of an instruction set independently of the first CPU 11. This assures that real-time special techniques are advantageously applicable to plural video dynamic-images, and further that high-speed response to the rendering of the static-image as well as to the variation in window-mode is realized. The above-described configuration is especially useful when the first CPU 11 finds it very troublesome to deal with task processing other than rendering processing.

In FIG. 6, the instruction/data memory 16 is connected only to the second data bus 14, however, such a configuration is not to be considered restrictive. The instruction/data memory 16 may be constituted with a dual port memory which stretches over both the first and second data buses 12 and 14. This configuration has an advantage over the one shown in this embodiment that it is free from overhead due to the first CPU 11 obtaining the right to use the second data bus 14. The first and second VSP's 7A and 7B may directly write dynamic-image data to each of the first and second dynamic-image memories 2A and 2B, without passing such data through these R/W control circuits.

FOURTH EMBODIMENT

The foregoing workstations each deal with two video dynamic-images, however, the number of video dynamic-images to be dealt with may be increased with a modified configuration.

Figure 7:
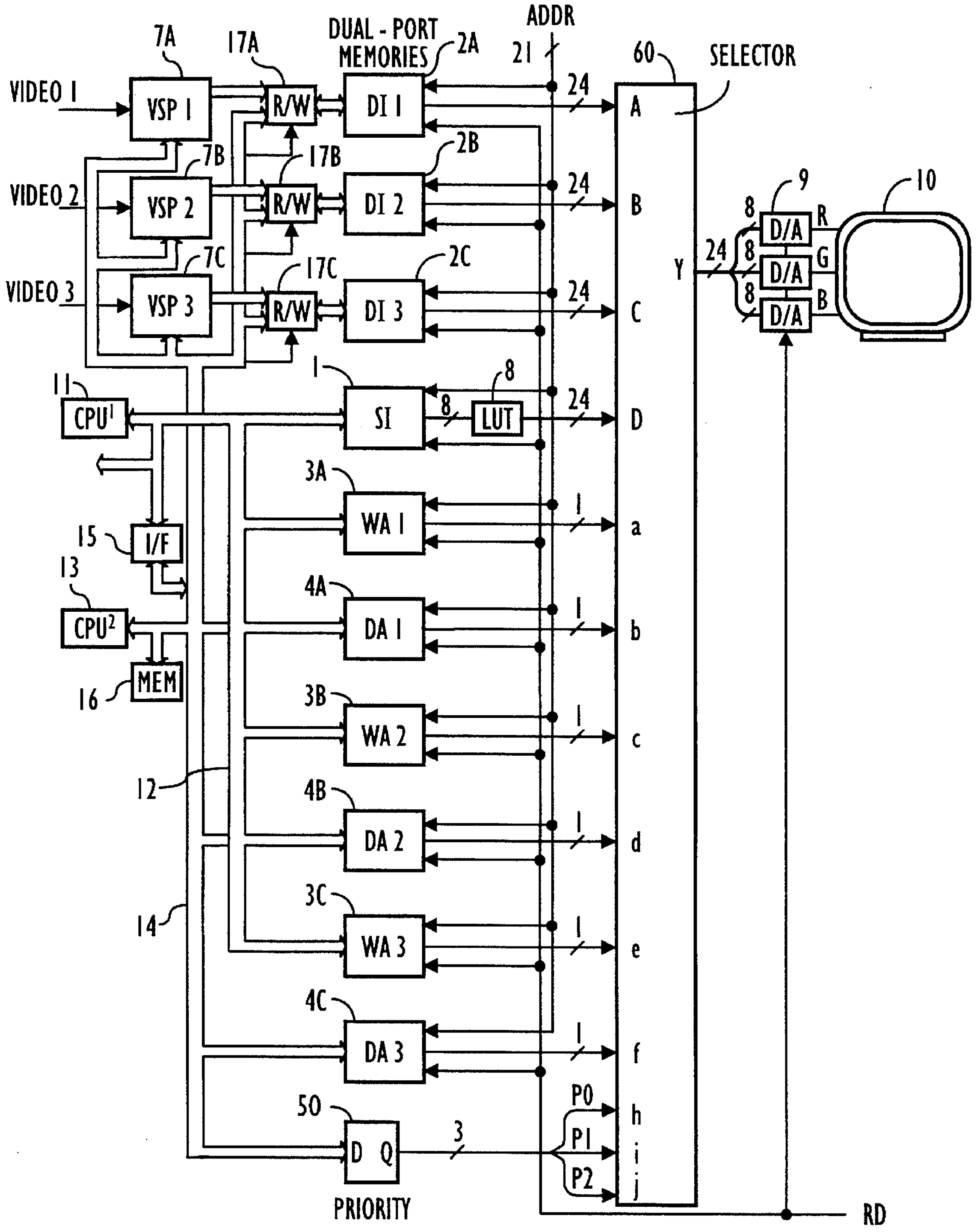
FIG. 7 is a block diagram illustrating a workstation for video display in accordance with a fourth embodiment of the invention.

FIG. 7 shows a fourth workstation for video display in accordance with a fourth embodiment. This workstation is used to display a picture made up by a static-image as a background image and three video dynamic-images assigned to their respective windows. This workstation results from expanding the configuration of the second workstation of FIG. 5. As shown in FIG. 7, this workstation further includes a third video signal processing circuit (VSP3) 7C, a third read/write (R/W) control circuit 17C, a third dynamic-image memory (DI3) 2C, a third window area memory (WA3) 3C, a third dynamic-image area memory (DA3) 4C, a priority control register 50, and a data selector 60. Other elements in FIG. 7 are identical with those of FIG. 5.

The priority control register 50 stores priority data P2 to P0 of 3-bits designating, when two or more video dynamic-images overlap with each other, which one of the video dynamic-image should come in front of other video dynamic-images. The second CPU 13 writes the priority data P2 to P0 according to Table 2. For example, the second CPU 13 writes priority data (P2=P1=P0="0") to the priority control register 50 if dynamic-image data in the second dynamic-image memory (DI2) 2B has priority over dynamic-image data in the third dynamic-image memory (DI3) 2C, and if dynamic-image data in the first dynamic-image memory (DI1) 2A has priority over dynamic-image data in the second dynamic-image memory (DI2) 2B.

TABLE 2

| Priority Display | | | Priority Data | | |
|---|---|---|---|---|---|
| 1st | 2nd | 3rd | P2 | P1 | P0 |
| DI1 | DI2 | DI3 | 0 | 0 | 0 |
| DI1 | DI3 | DI2 | 0 | 0 | 1 |
| DI2 | DI1 | DI3 | 0 | 1 | 0 |
| DI2 | DI3 | DI1 | 0 | 1 | 1 |
| DI3 | DI1 | DI2 | 1 | 0 | 0 |
| DI3 | DI2 | DI1 | OTHER COMBINATIONS | | |

All data per pixel in the first to third window area memories 3A, 3B, and 3C and the first to third dynamic-image area memories 4A, 4B, and 4C, and the priority data P2, P1, P0 stored in the priority control register 50 are fed to the data selector 60 as its select inputs (a- to f-inputs and h-inputs to j-inputs), as shown in FIG. 7. The data selector 60 is supplied with an A-input that is 24-bit (color) data from the first dynamic-image memory 2A, a B-input that is 24-bit (color) data from the second dynamic-image memory 2B, a C-input that is 24-bit (color) data from the third dynamic-image memory 2C, and a D-input that is 24-bit (color) data from the LUT 8 based on 8-bit read-out data (i.e., 256 individual items of color-designation data) of the static-image memory 1. The data selector 60 then selects one from among these four A- to D-inputs, and outputs the selected one according to the nine select inputs (a- to f-inputs and h- to j-inputs). The selection rules are shown in Table 3.

The above-described workstation is not limited only to an application for displaying a video dynamic-image in a window. It is applicable to an application for displaying two or three video dynamic-images in one window. Further, if it is so set in the latter application that window area data stored in at least two of the first to third window area memories 3A, 3B, and 3C perfectly match with each other, a selection of which dynamic-image data stored in the first to third dynamic-image memories 2A, 2B, and 2C should be selected for pixels corresponding to an overlap between video dynamic-images can flexibly be set to the priority control register 50 in the form of the priority data P2 to P0 of 3-bits by means of software.

As described above, when dealing with three video dynamic-images, priority data is three bits because the factorial of 3 (3!) is six. On the other hand, when dealing with four (or five) video dynamic-images, priority data is five (or seven) bits because the factorial of 4 (or 5) is 24 (or 120).

We claim:

1. A workstation for simultaneously displaying a plurality of video dynamic-images assigned to their respective windows while subjecting the plurality of video dynamic-images to overlap control, said workstation comprising:

(a) display means for displaying a picture formed by plural video dynamic-images;

(b) a plurality of dynamic-image memory means for storing dynamic-image data along with information on pixel addresses corresponding to each video dynamic-image to be displayed by said display means within assigned windows;

(c) a plurality of window area memory means for storing window area data designating a shape and size of a

TABLE 3

| Select Inputs | | | | | | Outputs |
|---|---|---|---|---|---|---|
| j (P2) | 1 (P1) | h (P0) | e·f (WA3·DA3) | c·d (WA2·DA2) | a·b (WA1·DA1) | Y |
| X | X | X | 0 | 0 | 0 | D |
| | | | 0 | 0 | 1 | A |
| | | | 0 | 1 | 0 | B |
| | | | 1 | 0 | 0 | C |
| 0 | 0 | 0 | 0 | 1 | 1 | A |
| 0 | 0 | 1 | | | | A |
| 0 | 1 | 0 | | | | B |
| 0 | 1 | 1 | | | | B |
| 1 | 0 | 0 | | | | A |
| (OTHERS) | | | | | | B |
| 0 | 0 | 0 | 1 | 0 | 1 | A |
| 0 | 0 | 1 | | | | A |
| 0 | 1 | 0 | | | | A |
| 0 | 1 | 1 | | | | C |
| 1 | 0 | 0 | | | | C |
| (OTHERS) | | | | | | C |
| 0 | 0 | 0 | 1 | 1 | 0 | B |
| 0 | 0 | 1 | | | | C |
| 0 | 1 | 0 | | | | B |
| 0 | 1 | 1 | | | | B |
| 1 | 0 | 0 | | | | C |
| (OTHERS) | | | | | | C |
| 0 | 0 | 0 | 1 | 1 | 1 | A |
| 0 | 0 | 1 | | | | A |
| 0 | 1 | 0 | | | | B |
| 0 | 1 | 1 | | | | B |
| 1 | 0 | 0 | | | | C |
| (OTHERS) | | | | | | C |

NOTES:
X means don't care
a·b = logical AND value of a-input and b-input window to which each video dynamic-image is assigned;

(d) a plurality of dynamic-image area memory means for storing dynamic-image area data designating a location of each dynamic-image data;

(e) priority data memory means for storing priority data indicating a display priority for overlap control when an overlap occurs between a plurality of video dynamic-images;

(f) control means for controlling the process of writing dynamic-image data to said plurality of dynamic-image memory means, writing window area data to said plurality of window area memory means, writing dynamic-image area data to said plurality of dynamic-image area memory means, and writing priority data to said priority data memory means; and (g) selection means for selectively feeding to said display means dynamic-image data from said plurality of dynamic-image memory means according to said priority data in said priority data memory means, said size and shape of each window designated by each of said plurality of window area memory means, and said location of each dynamic-image data designated by each of said plurality of dynamic-image area memory means, wherein a plurality of video dynamic-images are located inside respective windows and simultaneously displayed by said display means in an order of priority.

2. The workstation for simultaneously displaying a plurality of video dynamic-images according to claim 1, wherein said control means comprises:

(f-1) a plurality of video signal processing circuits for processing video signals to dynamic-image data and outputting said dynamic-image data into said plurality of dynamic-image memory means; and (f-2) a central processing unit for running a multi-window management program under operating system control for controlling said plurality of video signal processing circuits for writing said window area data to said plurality of window area memory means, for writing said dynamic-image area data to said plurality of dynamic-image area memory means, and for writing said priority data to said priority data memory means.

3. The workstation for simultaneously displaying a plurality of video dynamic-images according to claim 1, wherein said control means comprises:

(f-1) a plurality of video signal processing circuits for processing video signals to dynamic-image data and outputting said dynamic-image data into said plurality of dynamic-image memory means;

(f-2) a first central processing unit for running a multi-window management program under operating system control for writing said window area data to said plurality of window area memory means; and (f-3) a second central processing unit for executing an instruction set independently of said first central processing unit for controlling said plurality of video signal processing circuits, for writing said dynamic-image area data to said plurality of dynamic-image area memory means, and for writing said priority data to said priority data memory means.

4. The workstation for simultaneously displaying a plurality of video dynamic-images according to claim 1, wherein said control means comprises:

(f-1) a plurality of video signal processing circuits for processing video signals to dynamic-image data and outputting said dynamic-image data into said plurality of dynamic-image memory means;

(f-2) a first central processing unit for running a plurality of client programs under operating system control for rendering demands corresponding to said plurality of client programs; and (f-3) a second central processing unit for running a server program in a multi-window management program independently of said first central processing unit according to said rendering demands issued from said first central processing unit for controlling said plurality of video signal processing circuits, for writing said window area data to said plurality of window area memory means, for writing said dynamic-image area data to said plurality of dynamic-image area memory means, and for writing said priority data to said priority data memory means.

5. The workstation for simultaneously displaying a plurality of video dynamic-images according to claim 1, wherein said control means comprises:

(f-1) a plurality of video signal processing circuits for processing video signals to dynamic-image data and outputting said dynamic-image data into said plurality of dynamic-image memory means;

(f-2) a plurality of read/write control circuits for controlling the process of writing each dynamic-image data from said plurality of video signal processing circuits into said plurality of dynamic-image memory means and the process of reading each dynamic-image data thus written; and (f-3) a central processing unit for running a multi-window management program under operating system control for controlling said plurality of video signal processing circuits, for writing said window area data to said plurality of window area memory means, for writing said dynamic-image area data to said plurality of dynamic-image area memory means, for writing said priority data to said priority data memory means, and for reading each dynamic-image data from said plurality of dynamic-image memory means via said plurality of read/write control circuits.

6. The workstation for simultaneously displaying a plurality of video dynamic-images according to claim 1, wherein said control means comprises:

(f-1) a plurality of video signal processing circuits for processing video signals to dynamic-image data and outputting said dynamic-image data into said plurality of dynamic-image memory means;

(f-2) a plurality of read/write control circuits for controlling the process of writing each dynamic-image data from said plurality of video signal processing circuits into said plurality of dynamic-image memory means and the process of reading each dynamic-image data thus written;

(f-3) a first central processing unit for running a multi-window management program under operating system control for writing said window area data to said plurality of window area memory means and for reading each dynamic-image data from said plurality of dynamic-image memory means via said plurality of read/write control circuits; and (f-4) a second central processing unit for executing an instruction set independently of said first central processing unit for controlling said plurality of video signal processing circuits, for writing said dynamic-image area data to said plurality of dynamic-image area memory means, and for writing said priority data to said priority data memory means.

7. The workstation for simultaneously displaying a plurality of video dynamic-images according to claim 1, wherein said control means comprises:

(f-1) a plurality of video signal processing circuits for processing video signals to dynamic-image data and outputting said dynamic-image data into said plurality of dynamic-image memory means;

(f-2) a plurality of read/write control circuits for controlling the process of writing each dynamic-image data from said plurality of video signal processing circuits into said plurality of dynamic-image memory means and the process of reading each dynamic-image data thus written;

(f-3) a first central processing unit for running a multi-window management program under operating system control for writing said window area data to said plurality of window area memory means; and (f-4) a second central processing unit for executing an instruction set independently of said first central processing unit for controlling said plurality of video signal processing circuits, for writing said dynamic-image area data to said plurality of dynamic-image area memory means, for writing said priority data to said priority data memory means, and for reading each dynamic-image data from said plurality of dynamic-image memory means via said plurality of read/write control circuits.

8. The workstation for simultaneously displaying a plurality of video dynamic-images according to claim 1, wherein said control means comprises:

(f-1) a plurality of video signal processing circuits for processing video signals to dynamic-image data and outputting said dynamic-image data into said plurality of dynamic-image memory means;

(f-2) a plurality of read/write control circuits for controlling the process of writing each dynamic-image data from said plurality of video signal processing circuits into said plurality of dynamic-image memory means and the process of reading each dynamic-image data thus written;

(f-3) a first central processing unit for running a plurality of client programs under operating system control for rendering demands corresponding to said plurality of client programs; and (f-4) a second central processing unit for running a server program in a multi-window management program independently of said first central processing unit according to said rendering demands issued from said first central processing unit for controlling said plurality of video signal processing circuits, for writing said window area data to said plurality of window area memory means, for writing said dynamic-image area data to said plurality of dynamic-image area memory means, for writing said priority data to said priority data memory means, and for reading each dynamic-image data from said plurality of dynamic-image memory means via said plurality of read/write control circuits.

9. A workstation for simultaneously displaying a static-image as a background image, and a first and a second video dynamic-image assigned to their respective windows while subjecting the first and second video dynamic-images to overlap control, said workstation comprising:

(a) a display for displaying a static-image and a first and a second video dynamic-image;

(b) a first central processing unit for running a multi-window management program for rendering control commands under operating system control;

(c) a first data bus connected to said first central processing unit for data transmission;

(d) a second central processing unit for executing an instruction set independently of said first central processing unit;

(e) a second data bus connected to said second central processing unit for data transmission;

(f) a bus interface circuit interfaced between said first and second data buses for controlling data transmission between said first and second central processing units;

(g) a static-image memory for storing static-image data, said first central processing unit controlling the process of writing static-image data into said static-image memory via said first data bus;

(h) a first video signal processing circuit for outputting first dynamic-image data by processing a first video signal according to first control commands set by said second central processing unit via said second data bus;

(i) a second video signal processing circuit for outputting second dynamic-image data by processing a second video signal according to second control commands set by said second central processing unit via said second data bus;

(j) a first dynamic-image memory for storing said first dynamic-image data outputted from said first video signal processing circuit;

(k) a second dynamic-image memory for storing said second dynamic-image data outputted from said second video signal processing circuit;

(l) a first read/write control circuit for controlling the process of writing said first dynamic-image data outputted from said first video signal processing circuit into said first dynamic-image memory, and a process of reading and transferring said first dynamic-image data thus written to said second central processing unit via said second data bus;

(m) a second read/write control circuit for controlling the process of writing said second dynamic-image data outputted from said second video signal processing circuit into said second dynamic-image memory, and a process of reading and transferring said second dynamic-image data thus written to said second central processing unit via said second data bus;

(n) a first window area memory for storing first window area data designating a shape and size of the window corresponding to said first dynamic-image data stored in said first dynamic-image memory, said first central processing unit controlling the process of writing into said first window area memory said first window area data via said first data bus;

(o) a first dynamic-image area memory for storing first dynamic-image area data designating a memory location of said first dynamic-image data stored in said first dynamic-image memory, said second central processing unit controlling the process of writing into said first dynamic-image area memory said first dynamic-image area data through said second data bus;

(p) a second window area memory for storing second window area data designating a shape and size of the window corresponding to said second dynamic-image data stored in said second dynamic-image memory, said first central processing unit controlling the process of writing into said second window area memory said second window area data via said first data bus;

(q) a second dynamic-image area memory for storing second dynamic-image area data designating a memory location of said second dynamic-image data stored in said second dynamic-image memory, said second central processing unit controlling the process of writing into said second dynamic-image area memory said second dynamic-image area data through said second data bus;

(r) a priority control register for storing priority data, said second central processing unit controlling the process of writing into said priority control register via said second data bus a designation of display priority between said first dynamic-image data stored in said first dynamic-image memory and said second dynamic-image data stored in said second dynamic-image memory;

(s) a data selector for selectively feeding to said display said first and second dynamic-image data from said first and second dynamic-image memories and said static-image data stored in said static-image memory according to said priority data in said priority data memory register, said size and shape of each window designated by said first and second window area memories, respectively, said location of said first and second dynamic-image data designated by said first and second dynamic-image area memories, respectively; and (t) a digital-to-analog converter for generating video signals to said display from said data selector, wherein a plurality of video dynamic-images are located inside respective windows and simultaneously displayed by said display means in an order of priority.

* * * * *